(12) United States Patent
Arroyo

(10) Patent No.: US 6,718,402 B1
(45) Date of Patent: Apr. 6, 2004

(54) METHOD AND SYSTEM FOR PERSISTENT UNIT ATTENTION IN A FIBRE CHANNEL STORAGE ROUTER

(75) Inventor: Keith Arroyo, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 579 days.

(21) Appl. No.: 09/725,353

(22) Filed: Nov. 29, 2000

(51) Int. Cl.$^7$ ............................................. G06F 13/14
(52) U.S. Cl. ..................... 710/19; 710/129; 709/208; 709/211; 709/230; 709/227; 709/370; 709/352
(58) Field of Search ................... 710/19, 129; 709/208, 709/211, 227, 230; 370/352

(56) References Cited

U.S. PATENT DOCUMENTS

| | | | | | |
|---|---|---|---|---|---|
| 6,138,161 | A | * | 10/2000 | Reynolds et al. | ............ 709/227 |
| 6,205,141 | B1 | * | 3/2001 | Arroyo | ........................ 370/392 |
| 6,209,023 | B1 | * | 3/2001 | Dimitroff et al. | ........... 709/211 |
| 6,292,851 | B1 | * | 9/2001 | Takeda | ......................... 710/19 |
| 6,341,315 | B1 | * | 1/2002 | Arroyo et al. | .............. 709/230 |
| 6,421,753 | B1 | * | 7/2002 | Hoese et al. | ................. 710/129 |
| 6,542,924 | B1 | * | 4/2003 | Abe | ........................... 709/208 |

OTHER PUBLICATIONS

Snively, "Implementing a Fibre Channel SCSI Transport" Intellectual Leverage: Digest of Papers of the Spring Computer Society International Conference, pp. 78–82, Feb. 28, 1994.

* cited by examiner

Primary Examiner—Abdelmoniem Elamin
(74) Attorney, Agent, or Firm—Gray Cary Ware & Freidenrich LLP

(57) ABSTRACT

A method and system are disclosed for processing a unit attention signal from a target device in a Fiber Channel-to-SCSI network having a plurality of Fiber Channel hosts. One embodiment of the method includes the steps of, in a router: (a) receiving a first command for said target device from a first one of said Fiber Channel hosts; (b) forwarding said first command to said target device; (c) determining, at said target device, if said target device has undergone a status changing event since last receiving any command; (d) if said target device has undergone such a status changing event, then; (1) at said target device, issuing said UA signal in response to said first command; (2) forwarding said UA signal to said router and caching said UA signal at said router; (3) updating a register for said target device to indicate said UA signal is outstanding; (4) forwarding said UA signal to said first host and updating a UA table to indicate said UA signal has been forwarded to said first host; and (e) repeating steps (a)–(d) for a subsequent command from any of said Fiber Channel hosts, wherein said first command is said subsequent command and wherein said first host is the issuing host.

107 Claims, 3 Drawing Sheets

METHOD AND SYSTEM FOR PERSISTENT UNIT ATTENTION IN A FIBRE CHANNEL STORAGE ROUTER

TECHNICAL FIELD OF THE INVENTION

This invention relates generally to data and information communication systems and their operation, and, more particularly, to communications networks, including a Fibre Channel network. Even more particularly, the present invention relates to a method and system for maintaining a persistent unit attention signal in a Fibre Channel storage router in a multi-initiator Fibre Channel network.

BACKGROUND OF THE INVENTION

In a Fibre Channel-to-SCSI router architecture, one SCSI initiator (interface), such as a SCSI router, can speak to multiple SCSI targets on behalf of many Fibre Channel ("FC") initiators (hosts). The SCSI router provides an interface to efficiently manage commands and communications between the FC initiators and the SCSI targets. On the SCSI side of the network, each SCSI target is only aware of the SCSI router interface to which it is directly attached, and likewise, on the FC side of the network, each FC host sees only the SCSI router as a target. Neither the FC hosts nor the SCSI targets are aware of targets or hosts, respectively, on the other side of the SCSI router to which they are connected.

A Fibre Channel-to-SCSI router thus provides a pass-through data management role. For example, when a Fibre Channel host issues a command to a SCSI target, the SCSI router receives the command and forwards it to the target. To the FC host, the SCSI router is the target, and the data management role provided by the SCSI router is transparent to the host. Similarly, the SCSI target on the other side of the SCSI router sees the SCSI router to which it is attached as the initiator of the command. The data management role provided by the SCSI router is, likewise, transparent to the SCSI target. The situation is similar when it is the SCSI target sending a signal to a FC initiator through a SCSI router.

As part of their data management role, SCSI routers in a Fibre Channel-to-SCSI network can receive unit attention signals intended for a Fibre Channel host from a SCSI target. A unit attention signal is a signal sent out by a SCSI target to inform a host of the SCSI target's current status. In general, a SCSI target will issue a unit attention signal if it undergoes some change in status of which hosts on the network should be aware. For example, a SCSI target may want to inform all hosts communicating with it that it has been rebooted, or has gone off-line and come back on-line, sometime between the last communication between the SCSI target and one or more hosts. There can be different kinds of unit attention signals.

In current multi-initiator Fibre Channel-to-SCSI networks, however, not all Fibre Channel initiators querying a SCSI target will receive a unit attention signal issued by the SCSI target. This is because each SCSI target sees the SCSI router interface as the only initiator in the network. A SCSI target will issue only a single unit attention signal to each host upon receiving a communication, such as a command, from the host. Therefore, because a SCSI target sees the SCSI router as the only host on the FC side of the network, the first command from any FC host will elicit a unit attention signal from the SCSI target, but subsequent commands from other hosts will not, because the SCSI target sees all commands as originating from the SCSI router. A SCSI target in prior art Fibre Channel-to-SCSI networks will thus issue only a unit attention signal upon receiving the first command following a status changing event, but will issue no subsequent unit attention signals for the same status changing event.

Current Fibre Channel-to-SCSI routers thus do not provide a means by which all affected Fibre Channel hosts can receive a unit attention signal from a SCSI target that has undergone a status changing event. The Fibre Channel hosts in such prior art networks might, therefore, continue to behave as if they are in a particular relationship with a SCSI target when in fact the relationship has changed. The result of this confused state can lead to data corruption, component failure, and/or other unpredictable results within a Fibre Channel-to-SCSI network.

In particular, if a Fibre Channel host and a SCSI target are in a reserve relationship, a change in SCSI target status, such as a power loss, can result in the loss of the reserve relationship. This situation is more fully described in "Method and System for Maintaining Reserve Command Relationships in a Fibre Channel Network" disclosed in related U.S. patent application Ser. No. 09/251,759, filed on Feb. 18, 1999 (the "Maintaining Application") now U.S. Pat. No. 6,138,161, which is hereby incorporated by reference. For example, after recovering from a power loss, a SCSI target may receive a command from a Fibre Channel host other than the host with which it was previously in a reserve relationship. The SCSI target will issue a unit attention signal to the host issuing the command. For the reasons discussed above, with prior art SCSI routers, the unit attention signal will not be forwarded to the first Fibre Channel host. The Fibre Channel host that was in a reserve relationship with the SCSI target will thus be unaware of the loss of the reserve relationship and will not attempt re-establish that relationship. Therefore, other Fibre Channel hosts will be able to issue commands to the SCSI target, which the SCSI target will execute because it is no longer in a reserve relationship.

A SCSI target that has undergone and recovered from a status changing event and subsequently receives a command from a Fibre Channel host can execute the command and send out a unit attention signal. In this case, the unit attention signal acts only as an information mechanism. More typically, however, a SCSI target will issue a unit attention signal in response to a command from a host received while the target is still in an error condition. In such a case, the FC host can either reissue the command at a later time, or it can deal with the error condition in some other way. If the command is reissued while the SCSI target is still in an error condition, a different type of unit attention, or other error signal, can be issued in response by the target.

In prior art SCSI routers, if a FC host "A" is in a reserve relationship with a SCSI target, and the SCSI target undergoes a status changing event such that the reserve relationship is lost, several situations might develop. For example, a second Fibre Channel host "B" may be the first host to issue a command to the SCSI target after the status changing event. In response, the SCSI target will issue a unit attention signal through the SCSI router to FC host B. If the SCSI target rejects the command, FC host B might reissue the command. If FC host A issues a command subsequent to the command from FC host B, the SCSI target will not recognize FC host A as a separate host and will not issue a unit attention signal to FC host A. FC host A will be unaware that its reserve relationship with the SCSI target has been lost. Furthermore, If FC host B establishes a new reserve relationship with the SCSI target, FC host A will subsequently have its commands rejected by the SCSI target.

If, on the other hand, FC host B does not establish a reserve relationship with the SCSI target, commands from FC host A received after the SCSI target :z recovers might be executed simply because the SCSI i target is available, and not because the original reserve relationship still exists. FC host A will be unaware that the reserve relationship has lapsed and will continue to operate as if the reserve relationship still exists.

The SCSI target device in the above example will therefore go from a reserve relationship with FC host A, to being available to all FC hosts on the network on a first-come, first-served basis. The potential then exists for conflicts in commands to the SCSI target device. In particular, if the SCSI target device is a sequential access device, such as a tape drive, commands received while a previous command is executing can result in a loss of data, component failure and other unpredictable results. Potentially conflicting commands can also result even if the SCSI target device is a random access device.

The problems associated with failure to communicate a unit attention signal can arise not only in a reserve relationship, but also in situations where it is important to inform network hosts of the boot-up or failure of a target device. For example, problems can occur in a library-type environment, where the robotics handling library data tapes for the library tape drives must operate in a particular sequence that must be maintained even upon the loss or boot-up of a particular target tape drive.

In a pure SCSI network, or in a Fibre Channel-to-SCSI network having only a single Fibre Channel host, the problems discussed above are not a concern. In a pure SCSI network, a SCSI target device can keep track of all the hosts to which it is connected. In a single host Fibre Channel-to-SCSI network, it will not matter that the SCSI target considers the SCSI router as the initiator of all commands because the SCSI router is acting as a pass-through for a single Fibre Channel host. In a multi-initiator Fibre Channel-to-SCSI network, however, the problems discussed above can lead to reduced network performance and possible data corruption and/or loss.

SUMMARY OF THE INVENTION

Therefore, there is a need for a method and system for maintaining a persistent unit attention signal in a Fibre Channel-to-SCSI storage router that addresses the performance limitations arising in known methods and systems for processing signals from a SCSI target device to a Fibre Channel device in a Fibre Channel-to-SCSI network. In particular, a need exists for a method and system that can process, and maintain persistent, unit attention signals from a SCSI target to a Fibre Channel host.

A further need exists for a method and system for maintaining a persistent unit attention signal in a Fibre Channel-to-SCSI storage router that can track which Fibre Channel initiators in a multi-initiator Fibre Channel-to-SCSI network have received a unit attention signal from a SCSI target device.

An even further need exists, in a multi-initiator Fibre Channel-to-SCSI network, for a method and system for maintaining a persistent unit attention signal in a Fibre Channel-to-SCSI storage router that can transmit a unit attention signal from a SCSI target device to each Fibre Channel initiator communicating with the device, and that can maintain and track multiple such unit attention signals from multiple SCSI target devices.

An even further need exists for a method and system for maintaining a persistent unit attention signal in a Fibre Channel-to-SCSI router that can maintain existing relationships between a Fibre Channel initiator and a SCSI target undergoing a status change.

In accordance with the present invention, a method and system for maintaining a persistent unit attention signal in a Fibre Channel-to-SCSI storage router are provided that substantially eliminate or reduce the disadvantages and problems associated with known such systems and methods, including the problems of limited network performance, command rejection, corruption/loss of data, and general application failures.

More specifically, the present invention provides a method and system for processing a unit attention signal (to maintain it persistent) from a target device in a Fibre Channel-to-SCSI network having a plurality of Fibre Channel hosts. One embodiment of the method includes the steps of, in a router: (a) receiving a first command for said target device from a first one of said Fibre Channel hosts; (b) forwarding said first command to said target device; (c) determining, at said target device, if said target device has undergone a status changing event since last receiving any command; (d) if said target device has undergone such a status changing event, then; (1) at said target device, issuing said UA signal in response to said first command; (2) forwarding said UA signal to said router and caching said UA signal at said router; (3) updating a register for said target device to indicate said UA signal is outstanding; (4) forwarding said UA signal to said-first host and updating a UA table to indicate said UA signal has been forwarded to said first host; and (e) repeating steps (a)–(d) for a subsequent command from any of said Fibre Channel hosts, wherein said first command is said subsequent command and wherein said first host is the issuing host.

One embodiment of the system of this invention is a system for processing a unit attention ("UA") signal from a target device in a Fibre Channel-to-SCSI network having a plurality of Fibre Channel hosts This system comprises a Fibre Channel network link, a router, communicatively connected to the Fibre Channel network link via a network link, a plurality of host network links for communicatively connecting the Fibre Channel hosts to the Fibre Channel network link; a SCSI network link for communicatively connecting the target device to the router; a register associated with the router for tracking if the target device has issued an outstanding unit attention ("UA") signal, and a target UA table associated with the target device, for tracking which of the Fibre Channel hosts have been forwarded the outstanding UA signal.

The present invention provides an important technical advantage by providing a method and system that can process and maintain a unit attention signal from a SCSI target to a Fibre Channel host without the decline in network performance and possible data loss/corruption problems occurring in known Fibre Channel-to-SCSI architecture command processing methods and systems.

The method and system of the present invention provide another important technical advantage of being able to track which Fibre Channel initiators in a multi-initiator Fibre Channel-to-SCSI network have received a unit attention signal from a SCSI target device.

Yet another technical advantage of the method and system for maintaining a persistent unit attention signal in a Fibre Channel-to-SCSI storage router of this invention is the ability to forward a unit attention signal from a SCSI target device to each Fibre Channel initiator communicating with the storage device, and the capability to maintain and track multiple such unit attention signals from multiple SCSI target devices.

An even further technical advantage of the method and system of this invention is the capability to maintain existing relationships between a Fibre Channel initiator and a SCSI target undergoing a status changing event.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Figure 1:
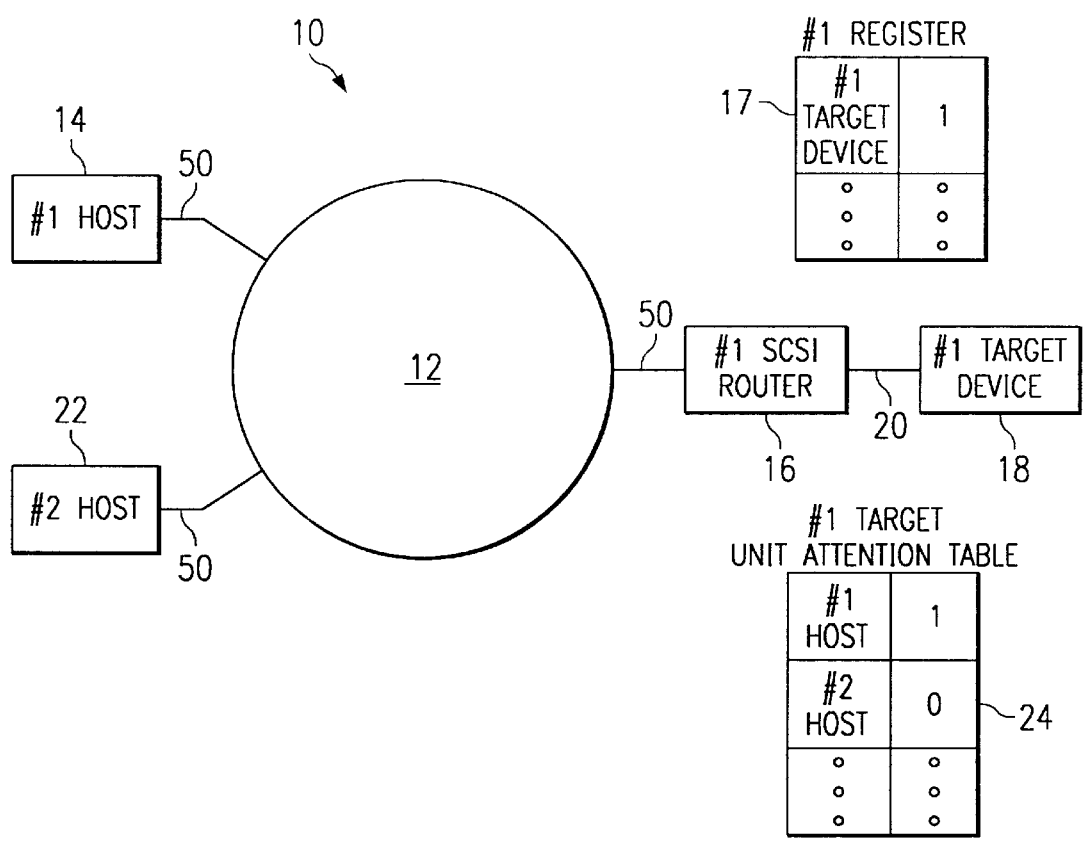
FIG. 1 is a conceptual diagram illustrating a Fibre Channel-to-SCSI network for implementing the method for maintaining a persistent unit attention signal in a Fibre Channel-to-SCSI storage router of the present invention.

Preferred embodiments of the present invention are illustrated in the FIGURES, like numerals being used to refer to like and corresponding parts of various drawings.

The present invention provides the capability, in a multi-initiator Fibre Channel-to-SCSI network, to process commands to a SCSI target device that has undergone a status changing event, without the loss of prior existing target-host relationships, corruption/loss of data, or other decreases in network performance. In particular, existing reserve relationships between the SCSI target and a Fibre Channel host can be maintained following a status changing event to the SCSI target. The present invention can create and maintain a functional record within a router of when a SCSI target device has issued a unit attention signal. The functional record can be in the form of a logical table comprising two sets of entries, one set for tracking the target devices attached to a router, and the second set for tracking whether a target device has issued an outstanding unit attention signal. The second set of entries can comprise simple one-bit registers. For example, a digital "one" can be used to indicate when a unit attention signal has been issued by a device and a digital "zero" can be used to indicate when no unit attention signal is outstanding for an attached device.

The present invention can also maintain a functional record of which, if any, Fibre Channel hosts have been forwarded the unit attention signal. This functional record can similarly be in the form of a table comprising two sets of entries, one set for tracking all the Fibre Channel hosts within the Fibre. Channel-to-SCSI network, and the second set for tracking which Fibre Channel hosts have received the unit attention signal. The tables of both of these functional records can be dynamic tables that grow or shrink as the number of hosts or target devices tracked change.

In this manner, the method and system for maintaining a persistent unit attention signal in a Fibre Channel-to-SCSI router of the present invention provides the ability to maintain relationships between a FC host and a SCSI target device following a change in status of the SCSI target device. The method and system of this invention can be equally functional in a Fibre Channel network having more than one SCSI router, wherein each SCSI router can have multiple SCSI target devices attached to and receiving commands from the SCSI router. In particular, when combined with the "Method and System for Multi Initiator Support to Streaming Devices in a Fibre Channel Network" disclosed in related pending U.S. patent application Ser. No. 09/317,800, filed on May 24, 1999 (the "Multi-Initiator Support Application"), and the "Method and System for Untagged Command Queuing" disclosed in related U.S. patent application Ser. No. 09/345,153, filed on Jun. 30, 1999 now U.S. Pat. No. 6,205,141 (the "Untagged Application"), the method and system of the present invention maintain network efficiency and avoid the data loss and communications failures caused by the issuance of multiple tagged or untagged commands to a streaming target device in a network comprised of multiple Fibre Channel hosts.

The Multi-Initiator Support Application discloses a method and system with the capability to queue multiple concurrent commands to a streaming target device such that the commands are forwarded to and received by the streaming target device only after the streaming target device has completed execution of a prior command. The Untagged Application discloses a method and system for converting tagged commands to an untagged format and for processing the converted commands to a streaming target device without rejection. These two inventions, combined with the method and system of the present invention, provide for the processing of multiple concurrent commands, whether in a tagged or untagged format, without the decrease in network performance that might result from a FC host not receiving a unit attention signal from a SCSI target device that has undergone a status changing event.

The present invention can also be used in combination with the "Streaming Method and System For Fibre Channel Network Devices" disclosed in related U.S. patent application Ser. No. 09/259,160, filed on Feb. 26, 1999 now U.S. Pat. No. 6,341,315 (the "Streaming Application"). The Streaming Application, the Multi-Initiator Support Application and the Untagged Application are hereby incorporated by reference in their entirety.

The Streaming Application discloses a method and system for processing read/write commands to a target device (including a streaming target device), regardless of the size of the read/write command. However, the data loss/corruption described in the present application can also occur in these read/write commands if a Fibre Channel initiator sends a read/write command to a SCSI target device that has undergone a status changing event.

The method and system of the present invention can thus be used in combination with the invention(s) disclosed in the Streaming Application to ensure that every Fibre Channel initiator is aware of the occurrence of a status changing event in a SCSI target device with which they are communicating. The speed and efficiency of the Fibre Channel-to-SCSI network environment can thereby be improved.

In FIG. 1 there appears a conceptual diagram of Fibre Channel-to-SCSI network 10 that includes Fibre Channel network link 12. Fibre Channel network link 12 communicatively connects #1 host 14 and #2 host 22 with #1 SCSI router 16 via network links 50. #1 target device 18 communicatively connects to #1 SCSI router 16 via SCSI network link 20. Network links 50 can be any Fibre Channel network connection and Network link 20 can be any SCSI network connection. #1 target device can be a streaming target device or a random access target device. #1 SCSI router 16 can be, for example, a Crossroads Systems Model 4100, 4200 or 4400 router manufactured by Crossroads Systems, Inc. of Austin, Tex. FIG. 1 illustrates a simple one-router, one-target device Fibre Channel-to-SCSI network implementing the method and system of this invention for maintaining a persistent unit attention signal in a Fibre Channel-to-SCSI router. However, the present invention can be implemented in a Fibre Channel network having multiple Fibre Channel hosts, multiple SCSI routers, and multiple network target devices.

FIG. 1 further includes #1 register 17 associated with #1 SCSI router 16, for tracking which attached target devices, in this case #1 target device 18, have issued an outstanding unit attention signal. Register 17 maintains a functional record of which target devices attached to a SCSI router have issued a unit attention signal. This functional record can comprise a one-bit digital register for each target device, where a "1" indicates an issued unit attention signal and a "0" indicates no issued signal. Register 17 can comprise a two-column logical table, wherein matched data pairs are stored. The matched data pairs can comprise a target device identifier and the one-bit register to indicate the existence of an issued unit attention signal.

Similarly, #1 target unit attention table 24 is associated with #1 SCSI router 16 and is used to track which, if any, Fibre Channel hosts have been forwarded an outstanding unit attention signal. For example, #1 host 14 is shown in #1 target unit attention table 24 as having received an outstanding unit attention signal. This is depicted in FIG. 1 by a digital "1" in the second column of #1 target unit attention table 24. #1 target unit attention table 24 can be a dynamically changing table that grows or contracts in size in direct relation to the number of hosts present on Fibre Channel network 10. Every Fibre Channel-to-SCSI storage router on Fibre Channel network 10 implementing the present invention will be able to keep track of the hosts attached to Fibre Channel network 10 using a table such as #1 target unit attention table 24.

In accordance with the teachings of the present invention, #1 SCSI router 16 creates and stores #1 target unit attention table 24 and #1 register 17. #1 register 17 and #1 target unit attention table 24 can be stored in memory, such as RAM, within #1 SCSI router 16. If #1 target device 18 undergoes a status changing event and issues a unit attention signal, #1 SCSI router 16 updates #1 register 17 to indicate that a unit attention signal was issued by #1 target device 18 and is outstanding. #1 SCSI router 16 also stores the unit attention signal in memory. An outstanding unit attention signal is one that has been issued, but not forwarded to all hosts attached to Fibre Channel network 10. #1 SCSI router 16 also updates #1 target unit attention table 24 to track when a Fibre Channel host, such as #1 host 14 or #2 host 22, are forwarded the unit attention signal by #1 SCSI router 16. #1 SCSI router 16 forwards a stored unit attention signal received from a target device to a host in response to a communication from the host to the target device. Once all hosts have received the unit attention signal issued by a target device, #1 register 17 and #1 target unit attention table 24 are reset for that target device. This same process occurs for each target device attached to a SCSI router.

When a target device, such as #1 target device 18, undergoes a status changing event, it may issue a unit attention signal in response to a command received through #1 SCSI router 16 from a host on Fibre Channel network 10. Because a target device attached to #1 SCSI router 16 sees all commands as originating from #1 SCSI router 16, it will issue the unit attention signal only once, in response to the first command from a host. The target device will issue the unit attention signal to #1 SCSI router 16, which can store the unit attention signal in memory, and then forward the unit attention signal to each host that issues a command to the target device. #1 SCSI router 16 updates #1 target unit attention table 24 and #1 register 17 as discussed above to track the status of each unit attention signal. A host issuing a command to the target device can reissue the command once it has received the unit attention signal. The host could, alternatively, issue a different command, or no command at all, in response to the unit attention signal. A target device can issue different unit attention signals in response to different status changing events.

The method for maintaining a persistent unit attention signal in a Fibre Channel-to-SCSI router of the present invention can be especially useful when one or more hosts is in a reserve command relationship with a target device, such as #1 target device 18 of FIG. 1. This is because, in a reserve command relationship, the host maintaining the reserve command relationship with a target device perceives the target device (or a portion of that target device) as being reserved for its exclusive use. If a target device in a reserve command relationship with a host undergoes a status changing event, such as a power failure and subsequent reboot, the reserve command relationship can be lost. In such a case, the target device can issue a unit attention signal to all hosts on Fibre Channel network 10 informing the hosts of the status changing event and of the loss of any reserve command relationships in existence. The method of this invention ensures that the unit attention signal is received by a host in a reserve command relationship with the target device. The host can then re-establish the reserve relationship, or at least not send any subsequent commands under the mistaken assumption that the reserve command relationship still exists.

Without the method and system of this invention, a target device will only issue a unit attention signal to the first host issuing a command to that target device subsequent to the status changing event. The first host issuing a command to the target device may or may not have been in a reserve command relationship with the target device prior to the status changing event. If a host in a reserve relationship does not receive the unit attention signal (i.e., it is not the first host to issue a command to the target device following the status changing event), the host may issue a subsequent command to the target device under the belief that it is still in a reserve command relationship with the target device. Loss/corruption of data, communications failure or a decrease in network performance can result.

Figure 2:
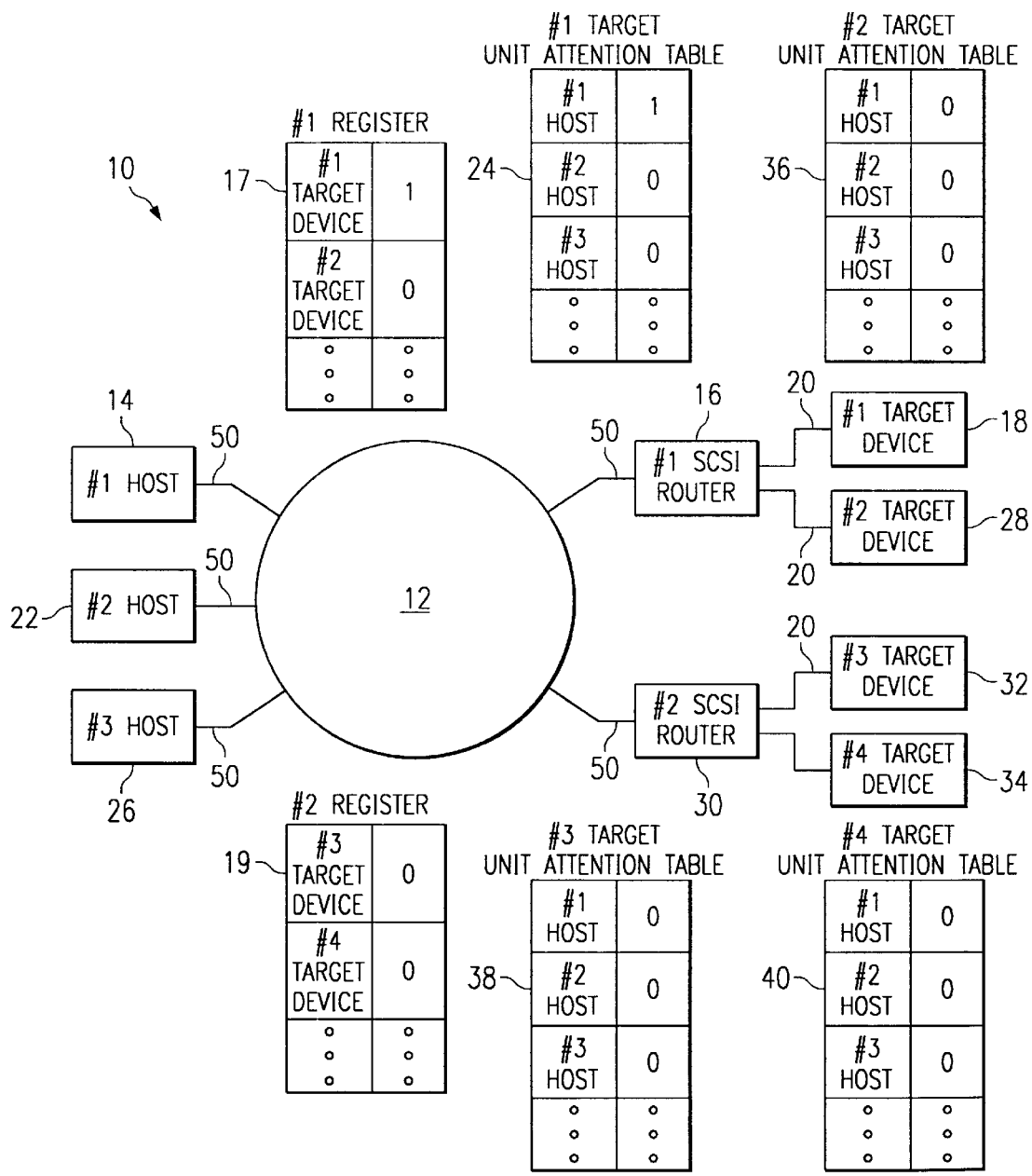
FIG. 2 is a conceptual diagram illustrating the use of the method of the present invention in a multi-host, multi-router, and multi-SCSI target device Fibre Channel-to-SCSI network.

FIG. 2 shows a modified Fibre Channel network 10 illustrating the capability of the present invention to process unit attention signals from multiple target devices through multiple Fibre Channel-to-SCSI routers to multiple Fibre Channel hosts. Fibre Channel network 10 of FIG. 1 now also includes #3 host 26 and #2 SCSI router 30 communicatively connected to Fibre Channel network link 12 via network links 50. #2 register 19 is associated with #2 SCSI router 30 and has the same functionality as #1 register 17. Network links 50 can be any Fibre Channel network connection. #1 SCSI router 16 in FIG. 2 is communicatively connected to #1 target device 18, as in FIG. 1, and now also to #2 target device 28, via network links 20. #2 SCSI router 30 is communicatively connected to #3 target device 32 and to #4 target device 34 via network links 20. #1 SCSI router 16 and

2 SCSI router 30 each maintain a unit attention table for each of the target devices to which they are connected. #1 target unit attention table 24 corresponds to #1 target device 18, #2 target unit attention table 36 corresponds to #2 target device 28, #3 target unit attention table 38 corresponds to #3 target device 32, and #4 target unit attention table 40 corresponds to #4 target device 34. Target unit attention tables 24, 36, 38, and 40 can be created and maintained within their respective SCSI routers. The size of target unit attention tables 24, 36, 38 and 40 can change dynamically to accommodate the total number of Fibre Channel hosts on Fibre Channel-to-SCSI network 10. The number of Fibre Channel hosts on Fibre Channel-to-SCSI ynetwork 10 is currently limited to 64 hosts by Fibre Channel technology constraints, but may increase as the FC protocol matures. Target unit attention tables 24, 36, 38 and 40, as well as registers 17 and 19, can grow to any size needed by a particular application and are limited only be the memory available within their respective Fibre Channel-to-SCSI routers.

Unit attention tables 24, 36, 38 and 40 can, as previously described, comprise a two-dimensional table containing matched data pairs. One-half of the matched data pair is the address of the Fibre Channel host on the network and the other half is a digital bit to track whether the corresponding host has been forwarded an outstanding unit attention signal. Each target device has a corresponding unit attention table. #1 SCSI router 16 and #2 SCSI router 30 each also maintain a register (e.g., #1 register 17 and #2 register 19) for tracking which attached target devices have outstanding unit attention signals. #1 register 17 and #2 register 19 likewise comprise two-dimensional tables containing matched data pairs. One-half of the matched data pairs is the target device address and the other half is a one-bit indicator for whether the corresponding target device has an outstanding unit attention signal.

Figure 3:
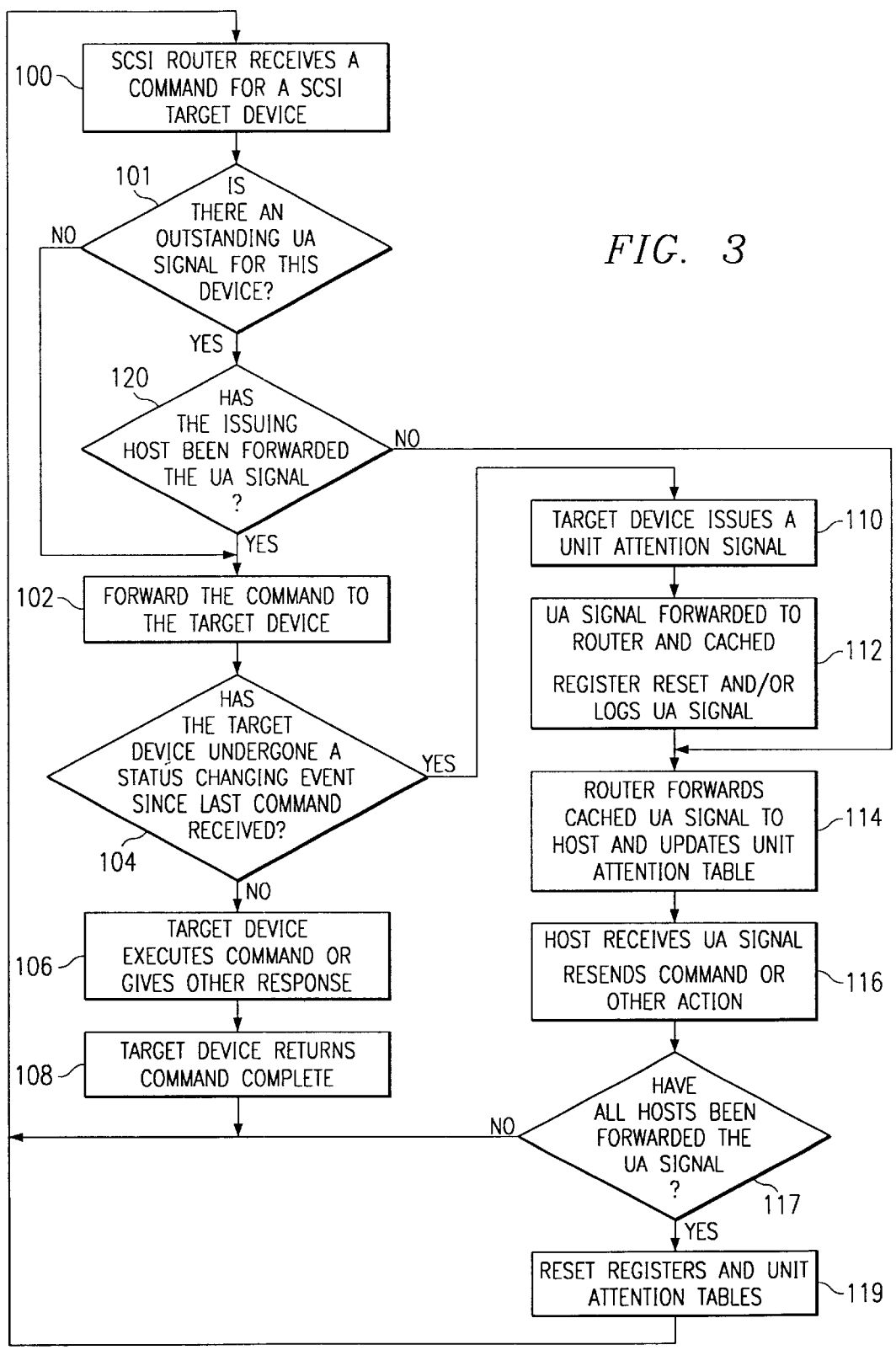
FIG. 3 shows a flowchart of one embodiment of the operational steps according to the teachings of the present invention.

FIG. 3 is a flow chart diagramming the overall operation of one embodiment of the method for maintaining a persistent unit attention signal in a Fibre Channel-to-SCSI router of the present invention. Although FIG. 3 diagrams the overall operation of one embodiment of the method of this invention, other embodiments are contemplated that comprise one or more, but not all, of the novel aspects of the overall method. The embodiment of the method of this invention illustrated in FIG. 3 begins at step 100 with Fibre Channel network 10 online and having at least one attached SCSI target device, such as #1 target device 18, and two or more attached Fibre Channel hosts as in FIG. 1. (FIG. 1 will be used in this description for illustration only.).

At step 100, #1 SCSI router 16 receives a command from a Fibre Channel host, such as #1 FC host 14, intended for a SCSI target device, such as #1 target device 18. At step 101, the method of this invention determines if there is an outstanding unit attention signal for the intended target device. If there is not, then, at step 102, #1 SCSI router 16 forwards the command to #1 SCSI target device 18. At step 104, the method of this invention determines if #1 target device 18 has undergone a status changing event since the last command it received.

If at step 104 it is determined that #1 target device 18 has undergone a status changing event, then at step 110 #1 target device 18 issues a unit attention signal in response to the command received from, in this case, #1 FC host 14. The unit attention signal issued by #1 target device 18 can contain different information depending on the specific status changing event that has occurred. The command received by #1 SCSI target device 18 from #1 FC host 14 can either be executed or rejected, depending on the status changing event. As used in this description, a command from a FC host can be any communication issued by the FC host.

If instead at step 104 the method of this invention determines that #1 SCSI target device 18 has not undergone a status changing event since the last command that it has received, then at step 106 #1 SCSI target device 18 will either execute the command or issue a response signal indicating it cannot execute the command for a reason not requiring a unit attention signal. At step 108, #1 SCSI target device 18 can return a command complete signal to #1 host 14 when the command has been executed, and the method of this invention returns to step 100 to await the next command from a FC host.

At step 112, the unit attention signal issued by #1 target device 18 is forwarded to #1 SCSI router 16, which caches (stores in memory) the unit attention signal. #1 SCSI router 16 stores the unit attention signal in a memory associated with said router to maintain it as a persistent unit attention signal that can later be forwarded to other Fibre Channel hosts that may issue commands to #1 SCSI target device 18. This feature of caching unit attention signals is an essential aspect of maintaining a unit attention signal in a persistent manner as per the teachings of the present invention. #1 SCSI router 16 also updates #1 register 17 to indicate that #1 target device 18 has an outstanding unit attention signal.

At step 114, #1 SCSI router 16 forwards the cached unit attention signal to the Fibre Channel host (#1 host 14) that issued the command and changes the status indication bit in #1 target unit attention table 24 to indicate that the host has been sent the unit attention signal. This is illustrated in FIG. 1, where #1 target unit attention table 24 has a digital 1 in the column and row corresponding to #1 host 14. At step 116, #1 Fibre Channel host 14 receives the unit attention signal and is made aware of #1 target device 18's status changing event. #1 host 14 can resend the command, or send some other communication, or choose to perform some other function in response to the unit attention signal.

At step 117, the method of this invention determines if all hosts on FC network 10 have received the unit attention signal from #1 target device 18. If they have, then at step 119, #1 register 17 and #1 target unit attention table 24 are reset (one bit digital registers set to "0"'s)and made ready for the next unit attention signal. A reset can also occur if #1 target device 18 issues a subsequent unit attention signal even if not all Fibre Channel hosts have been forwarded the first unit attention signal. Following step 119, the method of this invention returns to step 100 and proceeds as described above.

If instead at step 117 the method of this invention determines that not all Fibre Channel hosts have received the unit attention signal, then the method of this invention returns to step 100 and #1 SCSI router 16 can receive a subsequent command, in this example for #1 target device 18. This subsequent command can be a command from the same Fibre Channel host (#1 host 14), or from some other Fibre Channel host. The command can be a resending of the initial command or a totally new command. In the case where #1 SCSI router 16 has multiple target devices attached to it, the subsequent command can be for any attached target device.

Returning now to step 101, if instead there is an outstanding unit attention signal for the intended target device, then at step 120, the method of this invention determines, at #1 SCSI router 16, whether the host issuing the command has been forwarded the currently cached unit attention signal as indicated by #1 register 17. This is done by checking the status of the issuing host in #1 target unit attention table 24. If the Fibre Channel host issuing the command has been sent the currently cached unit attention signal, then the method of the present invention continues to step 102 and forwards the command to #1 target device 18. From step 102 forward, the operation of the method of the present invention is as described above. If, however, at step 120 the Fibre Channel host issuing a subsequent command has not been forwarded the currently cached unit attention signal, then the method of the present invention continues to step 114. From step 114, the operation of the method of this invention is as previously discussed.

The method of the present invention can reset #1 register 17 and #1 target unit attention table 24 once all of the Fibre Channel hosts attached to Fibre Channel-to-SCSI network 10 have been forwarded the currently cached unit attention signal. #1 SCSI router 16 can also reset #1 register 17 and #1 target unit attention table 24 in response to a subsequent status changing event occurring at #1 target device 18 (or at any target device for a multiple target device configuration). For example, #1 target device 18 undergoes a status changing event and indicates this situation by issuing a unit attention signal in response to a command received from #1 host 14. Subsequent to this command from #1 host 14, #1 target device 18 undergoes a second status changing event before #2 host 22 has issued a command to #1 target device 18 which will result in #2 host 22 receiving the cached unit attention signal, as per step 114 of FIG. 3. #1 host 14 in such a situation would have only received the first unit attention signal and #2 host 22 would not have yet received either unit attention signal. Upon receiving the second (subsequent) unit attention signal from #1 target device 18 in response to a command from any Fibre Channel host attached to Fibre Channel-to-SCSI network 10, #1 SCSI router 16 can reset #1 register 17 and #1 target unit attention table 24 to indicate the current unit attention signal status.

FIG. 3 diagrams the overall operation of the method for maintaining a persistent unit attention signal in a Fibre Channel-to-SCSI storage router of the present invention for the case of a single SCSI router 16, a single target device and two FC hosts. However, the method of the present invention is equally applicable to multiple SCSI router, multiple target device, and multiple Fibre Channel host Fibre Channel networks where the number of Fibre Channel hosts is greater than two.

The method and system of the present invention can be implemented as a change in the software instructions of a Fibre Channel-to-SCSI router that control the processing of commands between SCSI target devices and Fibre Channel hosts in a Fibre Channel-to-SCSI network. These changes can also be implemented in the storage router hardware for controlling the operation of the network. Modification to existing Fiber Channel-to-SCSI storage routers can be done with relatively little expense.

As discussed herein, a unit attention signal is issued following a status changing event. A status changing event is any event that disrupts the relationship between a target device and the Fibre Channel hosts within a Fibre Channel-to-SCSI network 10 to the extent that data loss/corruption can occur if communications continue without first correcting the cause of the event. For example, a loss of power with a subsequent power on, a change in operating modes, or some other error condition that substantially affects the operation of the target device. Another example of a status changing event requiring a unit attention signal is a reset of the SCSI bus. A SCSI bus reset will force every target device on the SCSI bus to reinitialize, which has the effect of a power off.

The method of the present invention can also be implemented in a Fibre Channel-to-SCSI network having target logical units ("LUNs"). A target LUN is a grouping of units (devices) that appears as a single target device on a SCSI network, but that contains separately addressable logical units within the target device. Each LUN can be addressed and the method of this invention can maintain a target unit attention table and a register entry for each logical unit. This is because even though the logical units within a target device are part of a single target, they can behave in an independent fashion and each one can issue a unit attention signal in response to a condition that does not affect the other LUNs within a target.

Although the present invention has been described in detail herein with reference to the illustrated embodiments, it should be understood that the description is by way of example only and is not to be construed in a limited sense. It is to be further understood, therefore, that numerous changes in the details of the embodiment of this invention and additional embodiments of this invention will be apparent to, and may be made by, persons of ordinary skill in the art having reference to this description. It is contemplated that all such changes and additional embodiments are within the spirit and true scope of the invention as claimed below.

What is claimed is:

1. A method for processing a unit attention ("UA") signal from a target device in a Fibre Channel-to-SCSI network having a plurality of Fibre Channel hosts, comprising the steps of, at a router:

(A) receiving a first command for said target device from a first one of said Fibre Channel hosts;

(B) after receiving said first command, determining if there is an outstanding UA signal for said target device;

(C) if there is an outstanding UA signal for said target device, then;

(D) determining if said first host has been forwarded said outstanding UA signal;

(E) if said first host has been forwarded said outstanding UA signal, then:

(1) forwarding said first command to said target device;

(2) determining, at said target device, if said target device has undergone a status changing event since last receiving any command;

(3) if said target device has undergone such a status changing event, then;

(a) at said target device, issuing said UA signal in response to said first command;

(b) forwarding said UA signal to said router and caching said UA signal at said router;

(c) updating a register for said target device to indicate said UA signal is outstanding;

(d) forwarding said UA signal to said first host and updating a UA table to indicate said UA signal has been forwarded to said first host; and (4) repeating steps (A)–(E)(3)(d) for a subsequent command from any of said Fibre Channel hosts, wherein said first command is said subsequent command and wherein said first host is the issuing host;

(F) if said first host has not been forwarded said outstanding UA signal, then completing steps (E)(3)(d)–(E)(4); and (G) if there is no outstanding UA signal for said target device, then completing steps (E)(1)–(E)(4).

2. The method of claim 1, wherein determining if said first host has been forwarded said outstanding UA signal comprises checking the status of said first host in said UA table.

3. The method of claim 1, further comprising the steps of receiving said UA signal at said first host, and said first host resending said first command or sending some other communication to said target device in response to said UA signal.

4. The method of claim 1, wherein said register comprises a functional record within said router for tracking whether said target device has issued a UA signal.

5. The method of claim 4, wherein said functional record comprises a two column logical table, wherein matched data pairs are stored, one in each column.

6. The method of claim 5, wherein said matched data pairs comprise a target device identifier, and a one bit digital register to indicate the existence of an outstanding UA signal for the corresponding target device.

7. The method of claim 5, wherein said logical table is a dynamically changing table that grows or shrinks in size in direct relationship to the number of target devices attached to said router.

8. The method of claim 1, wherein said UA table comprises a functional record within said router associated with said target device for tracking which of said Fibre Channel hosts have been forwarded said UA signal from said target device.

9. The method of claim 8, wherein said functional record comprises a two column logical table, wherein matched data pairs are stored, one in each column.

10. The method of claim 9, wherein said matched data pairs comprise a Fibre Channel host address, and a digital bit to indicate whether the associated Fibre Channel host has been forwarded said UA signal.

11. The method of claim 9, wherein said logical table is a dynamically changing table that grows or shrinks in size in direct relationship to the number of Fibre Channel Hosts in said network.

12. The method of claim 1, wherein said Fibre Channel-to-SCSI network further comprises a plurality of routers.

13. The method of claim 12, wherein each of the plurality of routers has at least one target device communicatively connected to and receiving commands through it from said plurality of Fibre Channel hosts.

14. The method of claim 1, wherein said router is a Fibre Channel-to-SCSI storage router.

15. The method of claim 1 wherein said register and said UA table are stored in ram within said router.

16. The method of claim 1, wherein caching said UA signal comprises storing said unit attention signal in a memory associated with said router to make it a persistent UA signal.

17. The method of claim 1, wherein said first command can be any communication from said first Fibre Channel host to said target device.

18. The method of claim 1, wherein said target device is a SCSI target device.

19. The method of claim 1, wherein updating said register and said unit attention table comprises changing the respective one bit register from a digital "0" to a digital "1".

20. The method of claim 1, wherein said Target device is a target logical unit, comprising one or more separately addressable logical units.

21. The method of claim 20, wherein said router maintains a register entry in said register for each separately addressable logical unit, and wherein said router maintains a UA table for each separately addressable logical unit.

22. A method for processing a unit attention ("UA") signal from a target device in a Fibre Channel-to-SCSI network having a plurality of Fibre Channel hosts, comprising the steps of, at a router:

(a) receiving a first command for said target device from a first one of said Fibre Channel hosts;

(b) forwarding said first command to said target device;

(c) determining, at said target device, if said target device has undergone a status changing event since last receiving any command;

(d) if said target device has undergone such a status changing event, then;
  (1) at said target device, issuing said UA signal in response to said first command;
  (2) forwarding said UA signal to said router and caching said UA signal at said router;
  (3) updating a register for said target device to indicate said UA signal is outstanding;
  (4) forwarding said UA signal to said first host and updating a UA table to indicate said UA signal has been forwarded to said first host; and (e) repeating steps (a)–(d) for a subsequent command from any of said Fibre Channel hosts, wherein said first command is said subsequent command and wherein said first host is the issuing host;

determining if all of said plurality of Fibre Channel hosts have been forwarded said UA signal; and if all of said Fibre Channel hosts have been forwarded said UA signal, then resetting said register and said UA table;

else, repeating steps (a)–(e).

23. The method of claim 22, wherein resetting said register and said UA table comprises setting respective one bit digital registers to a digital "0".

24. The method of claim 22, wherein a reset of said register and said UA table can occur upon the occurrence of a subsequent UA signal, even if not all of said Fibre Channel hosts have been forwarded said outstanding UA signal.

25. A system for processing a unit attention ("UA") signal from a target device in a Fibre Channel-to-SCSI network having a plurality of Fibre Channel hosts, comprising:

a router;

instructions for receiving a first command for said target device from a first one of said Fibre Channel hosts;

instructions for, after receiving said first command, determining if there is an outstanding UA signal for said target device;

instructions for, if there is no outstanding UA signal, or if there is an outstanding UA signal and said first host has been forwarded said outstanding UA signal:

forwarding said first command to said target device;

determining, at said target device, if said target device has undergone a status changing event since last receiving any command;

instructions for, if said target device has undergone such a status changing event;

at said target device, issuing said UA signal in response to said first command;

forwarding said UA signal to said router and caching said UA signal at said router;

updating a register for said target device to indicate said UA signal is outstanding;

forwarding said UA signal to said first host and updating a UA table to indicate said UA signal has been forwarded to said first host; and processing a subsequent command from any of said Fibre Channel hosts, wherein said first command is said subsequent command and wherein said first host is the issuing host; and instructions for, if there is an outstanding UA signal and said first host has not been forwarded said outstanding UA signal:
   forwarding said outstanding UA signal to said first host and updating a UA table to indicate said outstanding UA signal has been forwarded to said first host; and
   processing a subsequent command from any of said Fibre Channel hosts, wherein said first command is said subsequent command and wherein said first host is the issuing host.

26. The system of claim 25, further comprising instructions for determining if said first host has been forwarded said outstanding UA signal, said instructions comprising instructions for checking the status of said first host in said UA table.

27. The system of claim 25, further comprising instructions for receiving said UA signal at said first host, and instructions for said first host resending said first command or sending some other communication to said target device in response to said UA signal.

28. The system of claim 25, further comprising:
   instructions for determining if all of said plurality of Fibre Channel hosts have been forwarded said UA signal; and
   instructions for, if all of said Fibre Channel hosts have been forwarded said UA signal, resetting said register and said UA table.

29. The system of claim 28, wherein said instructions for resetting said register and said UA table comprise instructions for setting respective one bit digital registers to a digital "0".

30. The system of claim 25, wherein said register comprises a functional record within said router for tracking whether said target device has issued a UA signal.

31. The system of claim 30, wherein said functional record comprises a two column logical table, wherein matched data pairs are stored, one in each column.

32. The system of claim 30, wherein said matched data pairs comprise a target device identifier, and a one bit digital register to indicate the existence of an outstanding UA signal for the corresponding target device.

33. The system of claim 30, wherein said logical table is a dynamically changing table that grows or shrinks in size in direct relationship to the number of target devices attached to said router.

34. The system of claim 25, wherein said UA table comprises a functional record within said router associated with said target device for tracking which of said Fibre Channel hosts have been forwarded said UA signal from said target device.

35. The system of claim 34, wherein said functional record comprises a two column logical table, wherein matched data pairs are stored, one in each column.

36. The system of claim 35, wherein said matched data pairs comprise a Fibre Channel host address, and a digital bit to indicate whether the associated Fibre Channel host has been forwarded said UA signal.

37. The system of claim 25, wherein said Fibre Channel-to-SCSI network further comprises a plurality of routers.

38. The system of claim 37, wherein each of the plurality of routers has at least one target device communicatively connected to and receiving commands through it from said plurality of Fibre Channel hosts.

39. The system of claim 25, wherein said router is a Fibre Channel-to-SCSI storage router.

40. The system of claim 25, wherein said register and said UA table are stored in ram within said router.

41. The system of claim 25, wherein caching said UA signal comprises storing said unit attention signal in a memory associated with said router to make it a persistent UA signal.

42. The system of claim 25, A wherein said target device is a SCSI target device.

43. The system of claim 25, wherein said Target device is a target logical unit, comprising one or more separately addressable logical units.

44. The system of claim 25, wherein said router maintains a register entry in said register for each separately addressable logical unit, and wherein said router maintains a UA table for each separately addressable logical unit.

45. The system of claim 35, wherein said functional record tracks whether said target device has issued a UA signal.

46. The system of claim 35, wherein said logical table is a dynamically changing table that grows or shrinks in size in direct relationship to the number of Fibre Channel Hosts in said network.

47. A system for processing a unit attention ("UA") signal from a target device in a Fibre Channel-to-SCSI network having a plurality of Fibre Channel hosts, comprising:
   a Fibre Channel network link;
   a router, communicatively connected to said Fibre Channel network link via a network link;
   a plurality of host network links for communicatively connecting said plurality of Fibre Channel hosts to said Fibre Channel network link;
   a SCSI network link for communicatively connecting said target device to said router;
   a register associated with said router for tracking if said target device has issued an outstanding unit attention ("UA") signal; and
   a target UA table associated with said target device for tracking which of said plurality of Fibre Channel hosts have been forwarded said outstanding UA signal from said target device;
   wherein said register comprises a functional record within said router for tracking whether said target device has issued a UA signal;
   wherein said functional record comprises a two column logical table, wherein matched data pairs are stored, one in each column.

48. The system of claim 47, wherein said matched data pairs comprise a target device identifier, and a one bit digital register to indicate the existence of an outstanding UA signal for the corresponding target device.

49. The system of claim 47, wherein said logical table is a dynamically changing table that grows or shrinks in size in direct relationship to the number of target devices attached to said router.

50. The system of claim 47, wherein said target UA table comprises a functional record within said router associated with said target device for tracking which of said Fibre Channel hosts have been forwarded said UA signal from said target device.

51. The system of claim 50, wherein said matched data pairs comprise a Fibre Channel host address, and a digital bit to indicate whether the associated Fibre Channel host has been forwarded said UA signal.

52. The system of claim 50, wherein said logical table is a dynamically changing table that grows or shrinks in size in direct relationship to the number of Fibre Channel Hosts in said network.

53. The system of claim 47, wherein said register and said UA table are stored in ram within said router.

54. The system of claim 47, wherein said target device is a SCSI target device.

55. The system of claim 47, wherein said Target device is a target logical unit, comprising one or more separately addressable logical units.

56. The system of claim 47, wherein said router maintains a register entry in said register for each separately addressable logical unit, and wherein said router maintains a UA table for each separately addressable logical unit.

57. A system for processing a unit attention ("UA") signal from a target device in a Fibre Channel-to-SCSI network having a plurality of Fibre Channel hosts, comprising:

a Fibre Channel network link;

a router, communicatively connected to said Fibre Channel network link via a network link;

a plurality of host network links for communicatively connecting said plurality of Fibre Channel hosts to said Fibre Channel network link;

a SCSI network link for communicatively connecting said target device to said router;

a register associated with said router for tracking if said target device has issued an outstanding unit attention ("UA") signal; and a target UA table associated with said target device for tracking which of said plurality of Fibre Channel hosts have been forwarded said outstanding UA signal from said target device;

wherein said target UA table comprises a functional record within said router associated with said target device for tracking which of said Fibre Channel hosts have been forwarded said UA signal from said target device;

wherein said functional record comprises a two column logical table, wherein matched data pairs are stored, one in each column.

58. A method for processing a unit attention ("UA") signal from a target device in a network having a plurality of hosts including a first host, wherein each host within said plurality of hosts is capable of communicating in a first protocol, comprising:

(A) at a first router, receiving a first command for said target device from a first one of said hosts;

(B) at said first router, after receiving said first command, determining if there is an outstanding UA signal for said target device;

(C) at said first router, if there is an outstanding UA signal for said target device, then;

(D) determining if said first host has been forwarded said outstanding UA signal;

(E) if said first host has been forwarded said outstanding UA signal, then;

(1) at said first router, forwarding said first command to said target device, wherein the target device is capable of communicating in a second protocol that is different from said first protocol;

(2) determining, at said target device, if said target device has undergone a status changing event since last receiving any command;

(3) if said target device has undergone said status changing event, then;

(a) at said target device, sending said UA signal to said first router in response to said first command;

(b) caching said UA signal at said first router;

(c) at said first router, updating a register for said target device to indicate said UA signal is outstanding;

(d) at said first router, forwarding said UA signal to said first host and updating a UA table to indicate said UA signal has been forwarded to said first host; and (4) repeating (E)(1)–(E)(3)(d) for a subsequent command from any of said hosts, wherein said subsequent command is treated as said first command and wherein any of said hosts is treated as said first host;

(F) if said first host has not been forwarded said outstanding UA signal, then completing steps (E)(3)(d)–(E)(4); and (G) if there is no outstanding UA signal for said target device, then completing steps (E)(1)–(E)(4).

59. The method of claim 58, wherein determining if said first host has been forwarded said outstanding UA signal comprises checking the status of said first host in said UA table.

60. The method of claim 58, further comprising receiving said UA signal at said first host, and said first host sending any communication to said target device in response to said UA signal.

61. The method of claim 58, further comprising:

determining if all of said plurality of hosts have been forwarded said UA signal; and if all of said hosts have been forwarded said UA signal, then resetting said register and said UA table;

else, repeating (A)–(G).

62. The method of claim 61, wherein resetting said register and said UA table comprises setting respective one bit digital registers to a digital "0".

63. The method of claim 61, wherein a reset of said register and said UA table can occur upon the occurrence of a subsequent UA signal, even, if not all of said hosts have been forwarded said outstanding UA signal.

64. The method of claim 58, wherein said register comprises a functional record within said first router for tracking whether said target device has issued said UA signal.

65. The method of claim 64, wherein said functional record comprises a two column logical table for storing matched data pairs.

66. The method of claim 65, wherein said matched data pairs comprise a target device identifier, and a one bit digital signal to indicate the existence of an outstanding UA signal for the corresponding target device.

67. The method of claim 65, wherein said logical table is a dynamically changing table that grows or shrinks in size in direct relationship to the number of target devices attached to said first router.

68. The method of claim 58, wherein said UA table comprises a functional record within said first router associated with said target device for tracking which of said hosts have been forwarded said UA signal from said target device.

69. The method of claim 68, wherein said functional record comprises a two column logical table for storing matched data pairs.

70. The method of claim 69, wherein said matched data pairs comprise a host address, and a digital bit to indicate whether the associated host has been forwarded said UA signal.

71. The method of claim 69, wherein said logical table is a dynamically changing table that grows or shrinks in size in direct relationship to the number of said hosts in said network.

72. The method of claim 58, wherein said network further comprises a plurality of routers including said first router.

73. The method of claim 72, wherein each of the plurality of routers has at least one associated target device communicatively connected to and receiving commands through said each of the plurality of routers from said plurality of hosts.

74. The method of claim 58, wherein said first router is a Fibre Channel-to-SCSI storage router.

75. The method of claim 58, wherein said register and said UA table are stored in RAM within said first router.

76. The method of claim 58, wherein caching said UA signal comprises storing said unit attention signal in a memory associated with said first router to make it a persistent UA signal.

77. The method of claim 58, wherein said first command can be any communication from said first host to said target device.

78. The method of claim 58, wherein said target device is a SCSI target device and said first host is a Fibre Channel host.

79. The method of claim 58, wherein updating said register and said unit attention table comprises changing a respective one bit register from a digital "0" to a digital "1".

80. The method of claim 58, wherein said target device is a target logical unit, comprising one or more separately addressable logical units.

81. The method of claim 80, wherein said first router maintains a register entry in said register for each separately addressable logical unit, and wherein said first router maintains a UA table for each separately addressable logical unit.

82. A software product for use in a router for processing a unit attention ("UA") signal from a target device in a network having a plurality of hosts, comprising:
   instructions for forwarding a first command to said target device, wherein said instructions for forwarding are executed in response to receiving said first command for said target device from a first one of said hosts;
   instructions for, after receiving said first command, determining if there is an outstanding UA signal for said target device;
   instructions for, if there is no outstanding UA signal, or if there is an outstanding UA signal and said first host has been forwarded said outstanding UA signal:
      (a) forwarding said first command to said target device;
      (b) if said target device has undergone said status changing event:
         (1) forwarding said UA signal to said router and caching said UA signal at said router;
         (2) updating a register for said target device to indicate said UA signal is outstanding; and
         (3) forwarding said UA signal to said first host and updating a UA table to indicate said UA signal has been forwarded to said first host; and
      (c) processing said subsequent command from any of said hosts, wherein said subsequent command is treated as said first command and wherein said any of said hosts is treated as the first host; and
   instructions for, if there is an outstanding UA signal and said first host has not been forwarded said outstanding UA signal:
      (a) forwarding said outstanding UA signal to said first host and updating a UA table to indicate said outstanding UA signal has been forwarded to said first host; and
      (b) processing a subsequent command from any of said hosts, wherein said subsequent command is treated as said first command and wherein any of said hosts is treated as the first host.

83. The software product of claim 82, further comprising instructions for determining if said first host has been forwarded said outstanding UA signal, said instructions comprising instructions for checking the status of said first host in said UA table.

84. The software product of claim 82, further comprising:
   instructions for determining if all of said plurality of hosts have been forwarded said UA signal; and
   instructions for, if all of said hosts have been forwarded said UA signal, resetting said register and said UA table.

85. The software product of claim 84, wherein said instructions for resetting said register and said UA table comprise instructions for setting respective one bit digital registers to a digital "0".

86. The software product of claim 82, wherein said register comprises a functional record within said router for tracking whether said target device has issued a UA signal.

87. The software product of claim 86, wherein said functional record comprises a two column logical table for storing matched data pairs.

88. The software product of claim 87, wherein said matched data pairs comprise a target device identifier, and a one bit digital signal to indicate the existence of an outstanding UA signal for the corresponding target device.

89. The software product of claim 87, wherein said logical table is a dynamically changing table that grows or shrinks in size in direct relationship to the number of target devices attached to said router.

90. The software product of claim 82, wherein said UA table comprises a functional record within said router associated with said target device for tracking which of said hosts have been forwarded said UA signal from said target device.

91. The software product of claim 90, wherein said functional record comprises a two column logical table for storing matched data pairs.

92. The software product of claim 91, wherein said matched data pairs comprise a host address, and a digital bit to indicate whether the associated host has been forwarded said UA signal.

93. The software product of claim 91, wherein said logical table is a dynamically changing table that grows or shrinks in size in direct relationship to the number of hosts in said network.

94. The software product of claim 82, wherein said router is a Fibre Channel-to-SCSI storage router.

95. The software product of claim 82, wherein instructions for caching said UA signal comprise storing said UA signal in a memory associated with said router to make it a persistent UA signal.

96. The software product of claim 82, wherein said target device is a SCSI target device, and said first host is a Fibre Channel host.

97. The software product of claim 82, wherein said target device is a target logical unit, comprising one or more separately addressable logical units.

98. The software product of claim 97, wherein said router maintains a register entry in said register for each separately addressable logical unit, and wherein said router maintains a UA table for each separately addressable logical unit.

99. A system for processing a unit attention ("UA") signal from a target device in a network having a plurality of hosts, wherein the plurality of hosts are capable of communicating in a first protocol, and wherein the target device is capable of communicating in a second protocol different from the first protocol, comprising:
   a first router;
   a plurality of hosts;
   a plurality of first protocol network links to communicatively couple said first router and said hosts to one another;

a second protocol network link for communicatively connecting said target device to said first router;

a register associated with said first router for tracking if said target device has issued an outstanding UA signal; and a target UA table associated with said target device for tracking which of said plurality of hosts have been forwarded said outstanding UA signal from said target device;

wherein said register comprises a functional record within said first router for tracking whether said target device has issued a UA signal;

wherein said functional record comprises a two column logical table for storing matched data pairs.

100. The system of claim 99, wherein said matched data pairs comprise a target device identifier, and a one bit digital signal to indicate the existence of an outstanding UA signal for the corresponding target device.

101. The system of claim 99, wherein said logical table is a dynamically changing table that grows or shrinks in size in direct relationship to the number of target devices attached to said first router.

102. The system of claim 99, wherein said target UA table comprises a functional record within said first router associated with said target device for tracking which of said hosts have been forwarded said UA signal from said target device.

103. The system of claim 99, wherein said register and said UA table are stored in RAM within said first router.

104. The system of claim 99, wherein said target device is a SCSI target device and said plurality of hosts are Fibre Channel hosts.

105. A system for processing a unit attention ("UA") signal from a target device in a network having a plurality of hosts, wherein the plurality of hosts are capable of communicating in a first protocol, and wherein the target device is capable of communicating in a second protocol different from the first protocol, comprising:

a first router;

a plurality of hosts;

a plurality of first protocol network links to communicatively couple said first router and said hosts to one another;

a second protocol network link for communicatively connecting said target device to said first router;

a register associated with said first router for tracking if said target device has issued an outstanding UA signal; and a target UA table associated with said target device for tracking which of said plurality of hosts have been forwarded said outstanding UA signal from said target device;

wherein said target UA table comprises a functional record within said first router associated with said target device for tracking which of said hosts have been forwarded said UA signal from said target device;

wherein said functional record comprises a two column logical table for storing matched data pairs.

106. The system of claim 105, wherein said matched data pairs comprise a host address, and a digital bit to indicate whether the associated host has been forwarded said UA signal.

107. The system of claim 105, wherein said logical table is a dynamically changing table that grows or shrinks in size in direct relationship to the number of said hosts in said network.

* * * * *